(12) United States Patent  
Marano et al.

(10) Patent No.: US 11,953,613 B2
(45) Date of Patent: Apr. 9, 2024

(54) POSITION ESTIMATION FOR VEHICLES BASED ON VIRTUAL SENSOR RESPONSE

(71) Applicant: ABB Schweiz AG, Baden (CH)

(72) Inventors: Stefano Marano, Zurich (CH); Deran Maas, Zürich (CH); Fredrik Gustafsson, Nacka Strand (SE); Jonatan Olofsson, Linköping (SE)

(73) Assignee: ABB SCHWEIZ AG, Baden (CH)

( * ) Notice: Subject to any disclaimer, the term of this patent is extended or adjusted under 35 U.S.C. 154(b) by 490 days.

(21) Appl. No.: 17/208,266

(22) Filed: Mar. 22, 2021

(65) Prior Publication Data

US 2021/0293973 A1    Sep. 23, 2021

(30) Foreign Application Priority Data

Mar. 20, 2020   (EP) .................................... 20164667

(51) Int. Cl.

| | | |
|---|---|---|
| *G01S 19/14* | (2010.01) | |
| *G01S 5/02* | (2010.01) | |
| *G01S 19/24* | (2010.01) | |
| *G06F 18/21* | (2023.01) | |
| *G06F 18/2413* | (2023.01) | |
| *G06N 7/01* | (2023.01) | |

(52) U.S. Cl.
   CPC .......... *G01S 5/02528* (2020.05); *G01S 19/14* (2013.01); *G01S 19/243* (2013.01); *G06F 18/2193* (2023.01); *G06F 18/24147* (2023.01); *G06N 7/01* (2023.01)

(58) Field of Classification Search
   CPC .... G01S 19/14; G01S 19/243; G01S 5/02528; G06F 18/24147; G06F 18/2193; G06N 7/01

USPC .......................................................... 342/352
See application file for complete search history.

(56) References Cited

U.S. PATENT DOCUMENTS 11,105,933 B2 *   8/2021   Skupin .................... G01S 19/40
11,435,757 B2 *   9/2022   Hasberg ............. G01C 21/3848
(Continued)

FOREIGN PATENT DOCUMENTS

CN   110062919 A  *  7/2019  .......... B64C 39/024
SE       528298 C2    10/2006
(Continued)

OTHER PUBLICATIONS

European Patent Office, Extended Search Report issued in corresponding Application No. 20164667.6, dated Oct. 5, 2020, 8 pp.
(Continued)

*Primary Examiner* — Harry K Liu
(74) *Attorney, Agent, or Firm* — Greenberg Traurig, LLP (57) ABSTRACT

A method for determining an estimated position of a vehicle includes: receiving a measured sensor response determined with a scanning sensor of the vehicle, which is scanning an environment of the vehicle and determining the estimated position of the vehicle by generating a virtual sensor response for a possible position of the vehicle from an environmental map; and comparing the measured sensor response with the virtual sensor response for determining, how much the possible position and a real position of the vehicle at which the measured sensor response was generated, coincide.

17 Claims, 4 Drawing Sheets

(56) References Cited

U.S. PATENT DOCUMENTS

| | | | | |
|---|---|---|---|---|
| 2015/0127249 A1* | 5/2015 | Strau | .................... | G08G 1/0112 |
| | | | | 701/439 |
| 2019/0217476 A1* | 7/2019 | Jiang | ........................ | G05D 3/20 |
| 2019/0383945 A1 | 12/2019 | Wang et al. | | |

FOREIGN PATENT DOCUMENTS

| | | | | |
|---|---|---|---|---|
| WO | WO-2019194079 A1 * | 10/2019 | | |
| WO | WO-2021059437 A1 * | 4/2021 | ............. | G01S 13/89 |

OTHER PUBLICATIONS

Fairfield et al., "Active Localization on the Ocean Floor with Multibeam Sonar," IEEE, Oceans 2008, Piscataway, New Jersey, Sep. 15, 2008, 10 pp.

Karlsson et al., "Bayesian Surface and Underwater Navigation," IEEE Transactions on Signal Processing, vol. 54, No. 11, Nov. 2006, pp. 4204-4213.

Moratuwage et al., "Collaborative Multi-Vehicle Localization and Mapping in Marine Environments," IEEE—Sydney, Oceans 2010 IEEE, Piscataway, New Jersey, May 24, 2010, 6 pp.

* cited by examiner

POSITION ESTIMATION FOR VEHICLES BASED ON VIRTUAL SENSOR RESPONSE

FIELD OF THE INVENTION

The invention relates to the field of position estimation for vehicles. In particular, the invention relates to a method, a computer program, a computer-readable medium and a device for determining an estimated position of a vehicle.

BACKGROUND OF THE INVENTION

Navigation and in particular maritime navigation strongly relies on Global Navigation Satellite Systems (GNSS), such as GPS or Galileo. Usually, a GNSS is the primary source of information for positioning, navigation and timing and may be crucial for safe navigation at sea. Satellite-born radio signals used in GNSS are very weak, when received at the surface of the earth and are vulnerable to interference, jamming, and spoofing. Both unintentional interference and deliberate jamming may result in a failure of a maritime navigation system of a marine vessel. Spoofing can mislead the maritime navigation system to believe it is at a different location.

Interference and jamming may be caused by the presence of another transmission in the same band used by the GNSS. This interfering signal may render the desired GNSS signal unintelligible at the receiver. GNSS jamming devices, while illegal in most countries, can be easily bought and are available to anyone.

GNSS spoofing is a more sophisticated intentional attack that will cause the maritime navigation system to believe to be at a wrong location. The attacker broadcasts signals with same structure and frequency as the GNSS signals, the spoofed message is changed so receiver calculates incorrect position or time.

Another common use of GNSS jamming devices is related to the transport of goods by trucks. It is not uncommon for a truck to have a GNSS jamming device.

One approach to partially mitigate interference, jamming and spoofing requires the integration of the GNSS together with an inertial navigation system. Such a system may provide an acceptable position estimate for several minutes. Another approach requires augmenting the GNSS with additional signals in frequency bands not affected by the interferer.

SE 528 298 C2 describes a sea navigation apparatus, which uses a particle filter and a dynamic motion model that is based on triangulation of landmarks that are identified with radar measurements.

DESCRIPTION OF THE INVENTION

It is an objective of the invention to provide simple and effective position estimation for a vehicle, which does not rely on a global navigation satellite system.

This objective is achieved by the subject-matter of the independent claims. Further exemplary embodiments are evident from the dependent claims and the following description.

An aspect of the invention relates to a method for determining an estimated position and optional estimated orientation of a vehicle. The estimated position may be encoded as a 2D point or 3D point. The estimated orientation may be encoded as one or more angles.

The vehicle may be a marine vessel, an airborne vehicle and/or a land-based vehicle, such as a truck or car. In the following, all embodiments are described with respect to a marine vessel, however, it is understood that all these embodiments also may be applied to other types of vehicles.

The method may be automatically performed by a position estimation device, which may be a computing device installed in the vessel. The method may enable navigation in absence of a GNSS. The method may enable safe navigation even during a complete GNSS failure and detection of GNSS spoofing.

According to an embodiment of the invention, the method comprises: receiving a measured sensor response determined with a scanning sensor of the vehicle, which scanning sensor is scanning an environment of the vehicle, and determining the estimated position and optionally the estimated orientation of the vehicle by: generating a virtual sensor response for a possible position and optionally a possible orientation of the vehicle from an environmental map and comparing the measured sensor response with the virtual sensor response for determining, how much the possible position (and optionally the possible orientation) and a real position (and optionally a real orientation) of the vehicle at which the measured sensor response was generated, coincide.

A coincidence between the possible position and the real position (and optionally the orientations) may be provided with a weight indicating, how much the virtual sensor response and the measured sensor response coincide. A coincidence between the possible position and the real position may be provided based on a distance of the two positions. A coincidence between the possible orientation and the real orientation may be provided based on an angle between of the two orientations.

For example, the possible position and optionally the possible orientation may be updated recursively, such that the coincidence between the possible position and the real position grows. The estimated position may be determined as a possible position with a specific coincidence with the real position, for example, when the coincidence is higher than a threshold.

The scanning sensor may be a radar sensor, a lidar sensor and/or a sonar sensor. In general, the sensor may send a beam and/or ray into the environment and may acquire reflections of this ray.

According to an embodiment of the invention, the method comprises: determining the estimated position and optionally the estimated orientation of the vehicle with a recursive statistical model, in which a probability density function of the position and optional orientation is updated based on the measured sensor response.

In other words, the estimated position and optionally the estimated orientation may be determined by updating a statistical model with the measured sensor responses of a scanning sensor of the vehicle. The estimated position and optionally the estimated orientation, which may be seen as the state of the vehicle, may be modelled with a probability density function, which is updated by the statistical model. The statistical model may be implemented as an algorithm, which may be executed in an estimation device installed in the vehicle.

The receiving of the measured sensor response and the determination of the estimated position may be performed regularly. Regularly may mean that the scanning sensor measurements and the updates may be performed in regular intervals, such as every second.

The vehicle may be equipped with one or multiple radar systems, such as a marine radar system. Usually, radar systems are used to detect other vehicles, such as ships and obstacles, such as coastlines, etc. With the method, the position and optional orientation estimation may be performed based on sensor responses, which may be present anyway in the vehicle navigation system.

The measured sensor response may be a point cloud generated by the scanning sensor. Each point may be encoded by a distance and/or one or more angles. For every point an intensity of the reflection may be provided. The measured sensor response may comprise a plurality of points indicating reflections of rays determined with the scanning sensor. The rays may be radar rays, light rays, sonar rays, etc.

According to an embodiment of the invention, determining the estimated position and optionally the estimated orientation comprises: determining at least one possible position and optional possible orientation of the vehicle from the probability density function. For example, specific positions and/or orientations, where the probability density function is high, may be determined.

It also may be that the probability density function is modelled with discrete points, each of which corresponds to a position and/or orientation. Some or all of these points may be used as possible position and/or orientation.

According to an embodiment of the invention, the method further comprises: generating a virtual sensor response from an environmental map and the possible position and optional possible orientation. The environmental map may be stored in the device, which also performs the method. The environmental map may be a data structure, which models an environment of the vehicle. The environmental map may comprise information indicating reflection capabilities of points in the environment of the vehicle.

For example, the environmental map may provide information on the topology of a coastline, land and/or artefacts. The environmental map may be generated from satellite imagery.

The virtual sensor response may be encoded like the measured sensor response and/or may comprise points at which (virtual) reflections take place. The virtual sensor response may be a point cloud generated by the estimation device from the environmental map. Each point may be encoded by a distance and one or more angles. The virtual sensor response may comprise a plurality of points indicating reflections of virtual rays determined from the environmental map. The virtual sensor response may be generated by calculating possible reflections of a virtual ray reflected at the environment.

According to an embodiment of the invention, the method further comprises: producing a weight for the possible position and optional possible orientation by comparing the measured sensor response with the virtual sensor response, wherein the weight indicates how much the measured sensor response and the virtual sensor response coincide. For example, the measured sensor response and the virtual sensor response both may be encoded as images and/or may be compared with each other by image processing techniques. It also may be that a machine learning algorithm is trained to compare the measured sensor response with the virtual sensor response.

The result of the comparison may be a weight, i.e. a number, which indicates, how strong the measured sensor response and the virtual sensor response coincide.

According to an embodiment of the invention, the method further comprises: updating the probability density function with the weight for the possible position and optional possible orientation; and determining the estimated position and optionally the estimated orientation from the probability density function. With the new weights, the probability density function may be adapted, such that it reflects the new weights at the possible positions and optional possible orientations.

In general, the method uses data from a scanning sensor and a digital environmental map to determine the estimated position and optionally the estimated orientation. The method may be employed in a second navigation system completely independent of a GNSS navigation system. The returns of the scanning sensor may be continuously compared and matched with the environmental map.

It also may be that the estimated position and optionally the estimated orientation are used for supervising another navigation system, such as a GNSS navigation system. It may be determined, whether to other navigation system is working properly. In such a way a warning about a malfunction of the other navigation system may be generated.

According to an embodiment of the invention, the recursive statistical model is a recursive Bayesian estimation. A recursive Bayesian estimation is based on the assumption that the weights of the possible positions and/or orientations and/or the probability density function obeys Bayesian statistics. In a prediction step, the probability density function may be modified according to assumption about the movement of the vessel since the last acquisition of the measured sensor response. In an update step, the probability density function may be updated based on the measured sensor response and the environmental map.

Recursive Bayesian estimation includes algorithms such as a Kalman filtering, its adaptation to nonlinear systems, extended Kalman filtering and/or unscented Kalman filtering.

According to an embodiment of the invention, the recursive statistical model is particle filtering. A particle filter, wherein the state is represented by the vessel dynamical state, i.e. its position and optionally its orientation, may allow to estimate the state by using the measured sensor response. The state of the particle filter may comprise longitude, latitude, heading, and/or velocity.

According to an embodiment of the invention, the probability density function is modelled with a set of possible positions and optional possible orientations, each of which is associated with a weight. The virtual sensor response may be generated for each of these possible positions and optional possible orientations, wherein the weight of each possible position and optional possible orientation is updated by comparing the measured sensor response with the virtual sensor response. Each of the possible positions and optional possible orientations may be seen as a particle, which is modelled by the particle filter. For each particle, a virtual sensor response may be generated using the environmental map. The possible position and optional possible orientation may receive a weight update, which may be proportional to the fit of the virtual sensor response in the measured sensor response.

According to an embodiment of the invention, the points from the measured sensor response and the points from the virtual sensor response are compared by determining nearest neighbours and the weight depends on the distances of the nearest neighbours. As already mentioned, the measured sensor response and the virtual sensor response may be point clouds. For each of the points of one of the point clouds, nearest neighbours may be determined from the other point cloud. The overall distance of the nearest neighbours may be used for comparing the measured sensor response and the virtual sensor response and/or for determining a corresponding weight.

According to an embodiment of the invention, the environmental map indicates a reflection ability of a terrain with respect to a ray sent by the scanning sensor. Every point of the environmental map may encode such a reflection ability or at least may comprise data from which such a reflection ability can be determined. The virtual sensor response may be determined from the reflection ability.

According to an embodiment of the invention, the environmental map models slopes of a terrain. For example, the environmental map may be an elevation map. Such a map may be encoded by a wireframe model.

The virtual sensor response may be determined by calculating an incident angle from a virtual ray from the scanning sensor at a point of the environmental map, wherein the incident angle is calculated from the slope at the point of the environmental map. For example, it may be assumed that the reflection becomes maximal, when the incident angle approaches 90°.

According to an embodiment of the invention, the method further comprises: receiving positions and optional orientations of further movable objects in the environment of the vehicle; and including the movable objects into the environmental map, such that reflections by the movable objects are included into the virtual sensor response. For example, other vehicles as movable objects in the environment of the vehicle may send their positions to the vehicle with a navigation system, which performs the method. At the positions of the movable objects, the environmental map may be altered to account for their reflections.

According to an embodiment of the invention, the environmental map is generated from measured sensor responses and estimated position and optional estimated orientations of the vehicle. When another position estimation system, such as a GPSS, is working, the generated measured sensor responses may be used for updating and/or generating the environmental map. Measured reflections may be included into the environmental map based on the known position and/or orientation of the vehicle.

According to an embodiment of the invention, environmental maps generated by several vehicles are gathered and a collective environmental map is generated and distributed among the several vehicles. For example, the environmental maps may be sent to a central server, where the environmental maps are fitted into each other to form an overall environmental map. This overall environmental map may be sent back to some or all of the vehicles.

A further aspect of the invention relates to a computer program for determining an estimated position and optionally an estimated orientation of a vehicle, which, when being executed by a processor, is adapted to carry out the steps of the method of one of the previous claims. For example, the computer program may be executed in a navigation system of the vehicle.

A further aspect of the invention relates to a computer-readable medium, in which such a computer program is stored. For example, the computer-readable medium may be a memory of a navigation system of a vehicle. In general, a computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to a position and optional orientation estimation device for a vehicle adapted for performing the steps of the method as described herein. Such an estimation device may be a second navigation system independent of the GNSS and/or therefore may provide robustness against radio interference, jamming, and spoofing.

It has to be understood that features of the method as described in the above and in the following may be features of the computer program, the computer-readable medium and the estimation device as described in the above and in the following, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
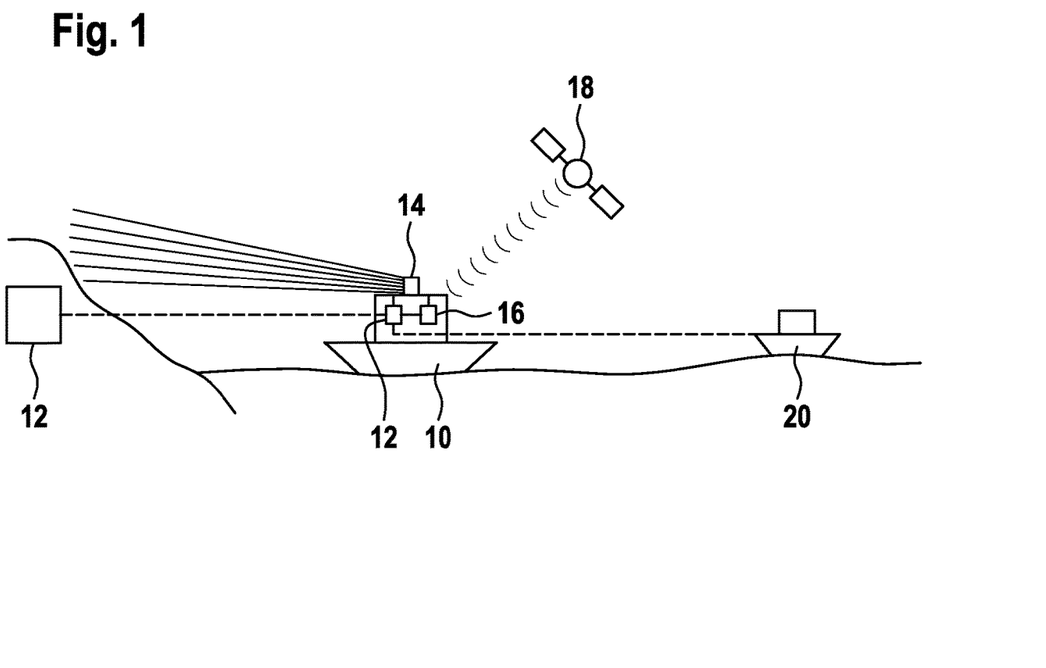
FIG. 1 schematically shows a marine vessel with a position estimation device according to an embodiment of the invention.

FIG. 1 shows a vehicle 10 in the form of a marine vessel, which comprises a position estimation device 12, which is adapted for position estimation based on sensor data acquired by a device of the vehicle 10. In particular, the vehicle 10 may evaluate the sensor data in combination with an environmental map and may determine its estimated position therefrom.

The sensor data is provided by a scanning sensor 14, such as a radar sensor, lidar sensor or sonar sensor, which also is installed on the vehicle 10. The vehicle furthermore may comprise a Global Navigation Satellite System (GNSS) 16, which is adapted for receiving signals from a plurality of satellites 18 and for determining a further estimated position therefrom.

FIG. 1 furthermore shows a further marine vessel, which in general may be seen as a movable object 20 in the environment of the vehicle 10. The marine vessel/movable object 20 may send its position and/or orientation to the vehicle 10. This information also may be used during determination of the estimated position.

In FIG. 1, also a central server 22 is shown. The vehicle 10 and in particular the position estimation device 12 may be adapted for determining information from which an environmental map may be generated. This information from a plurality of vehicles 10 may be used for generating a central environmental map, which then may be sent to the vehicle 10.

Figure 2:
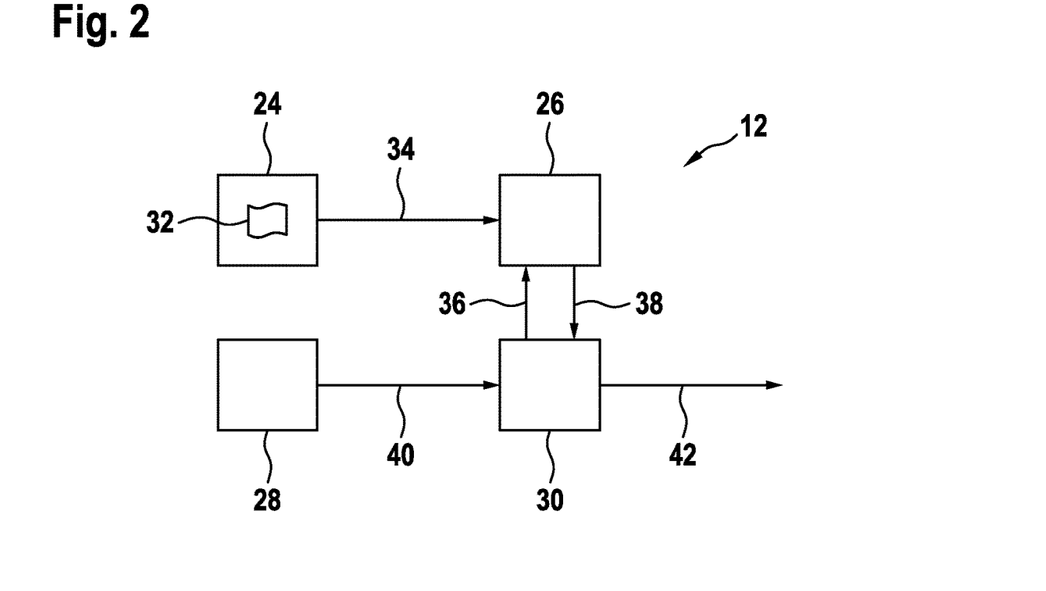
FIG. 2 schematically shows a modular design of a position estimation device according to an embodiment of the invention.

FIG. 2 shows a modular design of the position estimation device 12 and also will be used for illustrating a method for position estimation, which may be performed with the position estimation device 12.

The position estimation device 12 may comprise a map module 24, a virtual sensor response generator 26, a measured sensor response generator 28 and a statistical model 30.

The map module 24 stores an environmental map 32 and may provide at least a part 34 of the environmental map 32 to the virtual sensor response generator 26. The virtual sensor response generator receives a hypothetical vehicle state, in the form of a possible position 36 from the statistical model 30 and generates a virtual sensor response 38 from the part 34 of the environmental map 32 and the possible position 36. It has to be noted that here and in the following the position 36 of the vehicle 10 also may include an orientation of the vehicle and/or a speed of the vehicle 10.

The measured sensor response generator 28 generates a measured sensor response 40 from sensor data received from the scanning sensor 14. The statistical model 30 receives the measured sensor response 40 and compares it with a plurality of virtual sensor responses 38 for determining an estimated position 42 of the vehicle 10. The estimated position 42 also may include an orientation of the vehicle and/or a speed of the vehicle 10.

A method for determining the estimated position 42 of a vehicle 10 will be described with respect to FIG. 2.

The statistical model 30 regularly receives the measured sensor response 40 determined by the measured sensor response generator 28 from data from the scanning sensor 14, which scans the environment of the vehicle 10.

Figure 3:
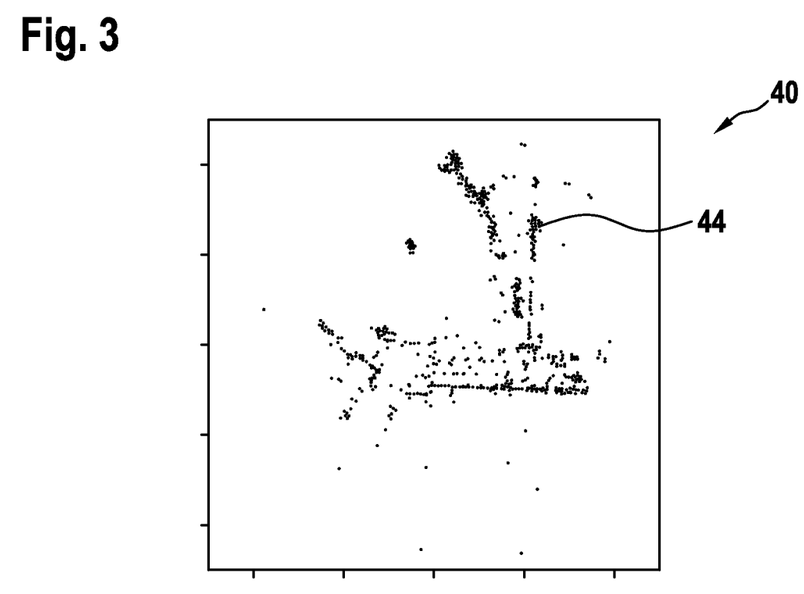
FIG. 3 illustrates a measured sensor response used in an embodiment of the invention.

FIG. 3 shows an example of a measured sensor response 40. It is shown that the measured sensor response 40 comprises a plurality of points 44 indicating reflections of rays determined with the scanning sensor 14. The points 44 in FIG. 3 are shown as points in a Cartesian coordinate system, however also may be provided by distance and angle or in another representation.

The statistical model 30 regularly determines the estimated position 42 of the vehicle 10 by updating a probability density function 46 of the estimated position 42 based on the measured sensor response 40.

The recursive statistical model 30 may be a recursive Bayesian estimation and in particular may be particle filtering.

Figure 4:
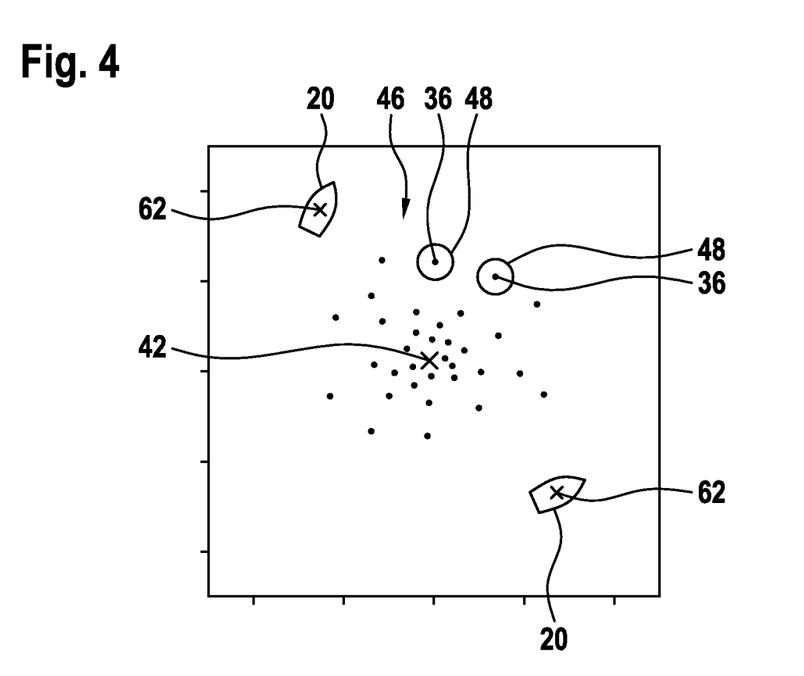
FIG. 4 illustrates a probability density function used in an embodiment of the invention.

FIG. 4 shows a probability density function 46 for particle filtering, which is modelled with a set of possible positions 36, each of which has a weight 48. In FIG. 4, solely some of the weights 48 are indicated.

The statistical model 30 sends each possible position 36 to the virtual sensor response generator 26, which generates a virtual sensor response 38 for each of these possible positions 36.

Each virtual sensor response 38 is generated from an environmental map 32 and the respective possible position 36.

Figure 5:
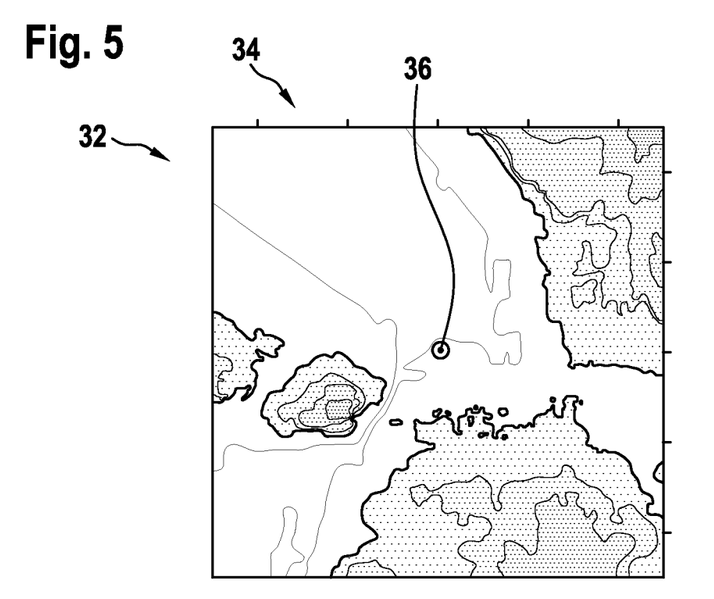
FIG. 5 illustrates an environmental map used in an embodiment of the invention.

FIG. 5 shows an example of a part 34 of the environmental map 32, which may be provided to the virtual sensor response generator 26. The part 34 is centered with respect to a possible position 36.

In FIG. 5, contour lines of a terrain are indicated. This may be used for deriving a reflection ability of the terrain. However, also the reflection ability of the terrain with respect to a specific direction also may be directly encoded in the environmental map 32. The virtual sensor response 38 may be determined from the reflection ability.

The environmental map 32 may be an elevation map and/or may be generated from satellite data. An elevation map may be used instead of a sea chart, because of several reasons. Sea charts usually are generated from bitmapped images of old sea charts. These may not represent the coastline in an absolute sense, and may be tens of meters off reality. Further, coastlines usually are not static objects and may change over time.

The environmental map 32 may be generated from satellite data. For example, elevation maps may be generated from satellite data, and may thus be updated more regularly than sea charts. Elevation maps may be global, while sea charts may be more accurate in densely trafficked waters. Furthermore, elevation maps may generate more accurate predictions of the virtual sensor response 38. For instance, steep coastlines will give a much more distinct and larger return signal and/or reflection than a shallow beach. Further, hills and slopes further away from the coastline will also reflect the sensor signal, which may indicate reflections that cannot be predicted from a sea chart.

It also may be that the environmental map 32 is generated from measured sensor responses 40 and estimated positions 42 of the vehicle 10. With the measured sensor responses 40, the environmental map 32 may be improved. It also may be that environmental maps 32 generated by several vehicles 10 are sent to a central server 22. The environmental maps 32 may be gathered and a collective environmental map may be generated and distributed among the several vehicles 10.

Figure 6:
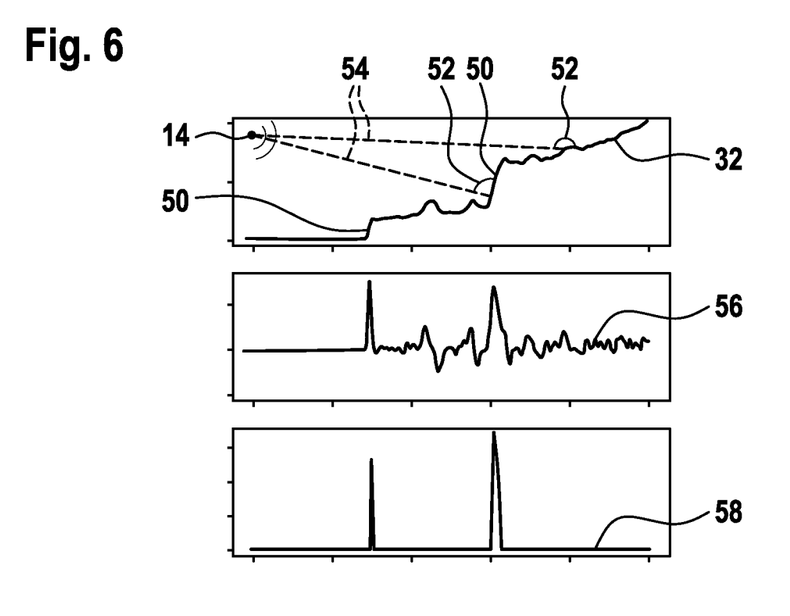
FIG. 6 shows a diagram describing how virtual reflections are calculated in an embodiment of the invention.

FIG. 6 shows several diagrams, how the virtual sensor response 38 may be determined from an elevation map. The upper diagram shows a cross section through the environmental map 32, which models slopes 50 of a terrain. The virtual sensor response 38 may be determined by calculating an incident angle 52 from a virtual ray 54 from the scanning sensor at a point of the environmental map 32, wherein the incident angle 52 is calculated from the slope 50 at the point of the environmental map 32.

The middle diagram of FIG. 6 shows a derivative 56 of the environmental map 32 along the virtual ray 54. The lower diagram shows a filtered derivative 58, which is determined by smoothing the derivative 56. At the points, where the filtered derivative 58 become higher as a threshold value, it may be assumed that there are strong reflections.

Figure 7:
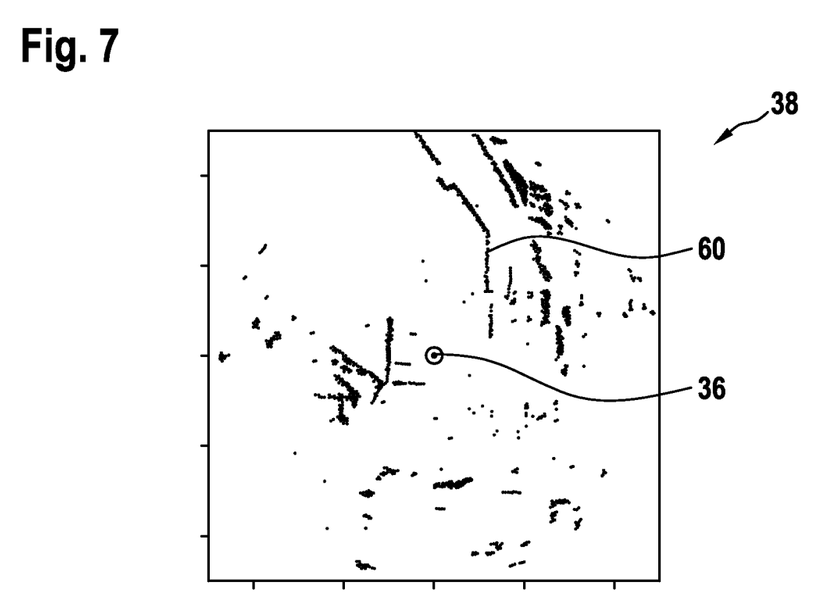
FIG. 7 illustrates a virtual sensor response used in an embodiment of the invention.

FIG. 7 shows a virtual sensor response 38, which may have been determined in such a way. The virtual sensor response 38 comprises a plurality of points 60 indicating reflections of virtual rays 54 determined from the environmental map 32.

It also maybe that the map module 24 receives positions 62 (see FIG. 4) of further movable objects 20 in the environment of the vehicle 10, which may be used for enhancing the virtual sensor response 38. The movable objects 20 may be included into the environmental map 32, such that reflections from the movable objects 20 are included into the virtual sensor response 38.

Returning to FIG. 4, the weight 48 of each possible position 36 is updated by comparing the measured sensor response 40 with the virtual sensor response 38 for this possible position 36. In general, the weight 48 may indicate how much the measured sensor response 40 and the virtual sensor response 38 coincide. The coincidence of the two data sets 38 and 40 also may be determined with a statistical method and/or with a machine learning algorithm.

For example, the points 44 from the measured sensor response 40 and the points 60 from the virtual sensor response 38 may be compared by determining nearest neighbours and the weight 48 for the possible position 36 may depend on the distances of the nearest neighbours.

As already mentioned, the statistical model 30 may be based on recursive Bayesian estimation. This family of algorithms includes Kalman filtering, its related adaptation to nonlinear systems, extended Kalman filtering, unscented Kalman filtering and particle filtering.

Recursive Bayesian estimation may comprise the steps of initialization, prediction and update, which all may be performed by the statistical model 30.

For example, during initialization, the probability density function 46 may be initialized with a random set of possible positions 36 around an initial position, which, for example, may be received from another positioning system, such as the GNSS 16. Possible positions 36 may be given the same weight 48. A particle filtering may have the advantage that solely a small state space may be needed to properly represent the distribution of positions 36. This may reduce the needed amount of computing power.

During prediction, the probability density function 46 may be predicted from a previous probability density function 46 and from a physical model. For example, the positions 36 may be updated from a speed of the vehicle.

In the update step, the probability density function 46 is updated using measurement data. In the present case, the measured sensor response 40 is compared with the virtual sensor responses 38 and the weights 48 are updated based on the comparison.

The predict and update steps may be repeated regularly and/or whenever a new measured sensor response 40 is available.

After each predict and update step, the estimated position 42 may be determined from the probability density function 46. For example, the estimated position 42 may be a weighted average of the positions 36 of the probability density function 46.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 vehicle
12 position estimation device
14 scanning sensor
16 Global Navigation Satellite System (GNSS)
18 satellite
20 movable object
22 central server
24 map module
26 virtual sensor response generator
28 measured sensor response generator
30 statistical model
32 environmental map
34 part of the environmental map
36 possible position
38 virtual sensor response
40 measured sensor response
42 estimated position
44 point
46 probability density function
48 weight
50 slope
52 incident angle
54 virtual ray
56 derivative
58 filtered derivative
60 point
62 position

The invention claimed is:

1. A method for determining an estimated position of a vehicle, the method comprising:
   receiving a measured sensor response determined with a scanning sensor of the vehicle, which is scanning an environment of the vehicle; and
   determining the estimated position of the vehicle by:
       generating a virtual sensor response for a possible position of the vehicle from an environmental map; and
       comparing the measured sensor response with the virtual sensor response for determining how much the possible position and a real position of the vehicle at which the measured sensor response was generated coincide;
   wherein the environmental map models slopes of a terrain;
   wherein the virtual sensor response is determined by calculating an incident angle from a virtual ray from the scanning sensors at a point of the environmental map, wherein the incident angle is calculated from the slope at the point of the environmental map.

2. The method of claim 1, further comprising:
   determining the estimated position of the vehicle with a recursive statistical model, in which a probability density function of the estimated position is updated based on the measured sensor response;
   wherein determining the estimated position comprises:
       determining at least one possible position of the vehicle from the probability density function;
       generating a virtual sensor response from an environmental map and the possible position;
       producing a weight for the possible position by comparing the measured sensor response with the virtual sensor response, wherein the weight indicates how much the measured sensor response and the virtual sensor response coincide;
       updating the probability density function with the weight for the possible position;
       determining the estimated position from the probability density function.

3. The method of claim 2, wherein the recursive statistical model is a recursive Bayesian estimation.

4. The method of claim 2,
   wherein the recursive statistical model is particle filtering;

wherein the probability density function is modelled with a set of possible positions, each of which has a weight;

wherein the virtual sensor response is generated for each possible position and the weight of each possible position is updated by comparing the measured sensor response with the virtual sensor response.

5. The method of claim 3, wherein the recursive statistical model is particle filtering;

wherein the probability density function is modelled with a set of possible positions, each of which has a weight;

wherein the virtual sensor response is generated for each possible position and the weight of each possible position is updated by comparing the measured sensor response with the virtual sensor response.

6. The method of claim 5, wherein the measured sensor response comprises a plurality of points indicating reflections of sensor pulses determined with the scanning sensor;

wherein the virtual sensor response comprises a plurality of points indicating reflections of rays determined from the environmental map;

wherein the points from the measured sensor response and the points from the virtual sensor response are compared by determining nearest neighbours and the weight depends on the distances of the nearest neighbours.

7. The method of claim 6, wherein the environmental map indicates a reflection ability of a terrain;

wherein the virtual sensor response is determined from the reflection ability.

8. The method of claim 1, further comprising:

receiving positions of further movable objects in the environment of the vehicle; and including the movable objects into the environmental map, such that reflections from the movable objects are included into the virtual sensor response.

9. The method of claim 1, wherein the environmental map is generated from measured sensor responses and estimated positions of the vehicle.

10. The method of claim 1, wherein environmental maps generated by several vehicles are gathered and a collective environmental map is generated and distributed among the several vehicles.

11. The method of claim 1, wherein the vehicle is a marine vessel.

12. The method of claim 1, wherein the measured sensor response comprises a plurality of points indicating reflections of sensor pulses determined with the scanning sensor;

wherein the virtual sensor response comprises a plurality of points indicating reflections of rays determined from the environmental map;

wherein the points from the measured sensor response and the points from the virtual sensor response are compared by determining nearest neighbours and the weight depends on the distances of the nearest neighbours.

13. The method of claim 1, wherein the environmental map indicates a reflection ability of a terrain; and wherein the virtual sensor response is determined from the reflection ability.

14. The method of claim 1, further comprising:

receiving positions of further movable objects in the environment of the vehicle; and including the movable objects into the environmental map such that reflections from the movable objects are included into the virtual sensor response.

15. A position estimation device adapted for determining the position for a vehicle, the position estimation device comprising:

receiving a measured sensor response determined with a scanning sensor of the vehicle, which is scanning an environment of the vehicle; and determining the estimated position of the vehicle by:

generating a virtual sensor response for a possible position of the vehicle from an environmental map; and comparing the measured sensor response with the virtual sensor response for determining how much the possible position and a real position of the vehicle at which the measured sensor response was generated coincide;

wherein the environmental map models slopes of a terrain;

wherein the virtual sensor response is determined by calculating an incident angle from a virtual ray from the scanning sensors at a point of the environmental map, wherein the incident angle is calculated from the slope at the point of the environmental map.

16. A computer program for determining an estimated position of a vehicle, which, when being executed by a processor performs an operation comprising:

receiving a measured sensor response determined with a scanning sensor of the vehicle, which is scanning an environment of the vehicle; and determining the estimated position of the vehicle by:

generating a virtual sensor response for a possible position of the vehicle from an environmental map; and comparing the measured sensor response with the virtual sensor response for determining how much the possible position and a real position of the vehicle at which the measured sensor response was generated coincide;

wherein the environmental map models slopes of a terrain;

wherein the virtual sensor response is determined by calculating an incident angle from a virtual ray from the scanning sensors at a point of the environmental map, wherein the incident angle is calculated from the slope at the point of the environmental map.

17. A non-transitory computer-readable medium, in which a computer program according to claim 16 is stored.

* * * * *